United States Patent
Telman et al.

(10) Patent No.: US 11,215,066 B2
(45) Date of Patent: Jan. 4, 2022

(54) SEALING RING ELEMENT FOR A TURBINE COMPRISING AN INCLINED CAVITY IN AN ABRADABLE MATERIAL

(71) Applicant: SAFRAN AIRCRAFT ENGINES, Paris (FR)

(72) Inventors: Cyrille Telman, Antony (FR); Olivier Arnaud Fabien Lambert, Sceaux (FR); Laurent Pierre Joseph Ricou, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 234 days.

(21) Appl. No.: 15/954,023

(22) Filed: Apr. 16, 2018

(65) Prior Publication Data
US 2018/0306048 A1    Oct. 25, 2018

(30) Foreign Application Priority Data

Apr. 20, 2017 (FR) .................................... 17 53423

(51) Int. Cl.
| | |
|---|---|
| F01D 11/12 | (2006.01) |
| F04D 29/52 | (2006.01) |
| F04D 29/68 | (2006.01) |
| F02C 7/28 | (2006.01) |
| F01D 5/22 | (2006.01) |

(52) U.S. Cl.
CPC .......... *F01D 11/122* (2013.01); *F01D 11/127* (2013.01); *F02C 7/28* (2013.01); *F04D 29/526* (2013.01); *F04D 29/685* (2013.01); *F01D 5/225* (2013.01); *F05D 2220/323* (2013.01); *F05D 2240/55* (2013.01); *F05D 2250/283* (2013.01)

(58) Field of Classification Search
CPC .... F01D 11/12–127; F01D 11/18; F01D 5/20; F01D 11/001; F05D 2220/323; F05D 2250/283
USPC ............................................ 415/173.1–173.7
See application file for complete search history.

(56) References Cited

U.S. PATENT DOCUMENTS

| | | | | |
|---|---|---|---|---|
| 4,239,452 A | * | 12/1980 | Roberts, Jr. ............. | F01D 11/12 415/173.5 |
| 4,466,772 A | * | 8/1984 | Okapuu .................. | F01D 11/08 415/171.1 |

(Continued)

FOREIGN PATENT DOCUMENTS

| | | |
|---|---|---|
| EP | 2 947 176 A1 | 11/2015 |
| GB | 2 017 228 A | 10/1979 |

OTHER PUBLICATIONS

French Preliminary Search Report dated Jan. 8, 2018 in French Application 17 53423 filed on Apr. 20, 2017 (with English Translation of Categories of Cited Documents).

*Primary Examiner* — David E Sosnowski
*Assistant Examiner* — Hakeem M Abdellaoui
(74) *Attorney, Agent, or Firm* — Oblon, McClelland, Maier & Neustadt, L.L.P.

(57) ABSTRACT

A sealing ring element of a turbomachine includes: a sealing portion with a first area and a second area, with the inner surface of a first area being at the same radial distance from the axis of the turbomachine. The sealing portion includes an annular cavity which opens into an inner surface of the second area and extends into the first area, the annular cavity defining an upstream lateral wall and/or a downstream lateral wall forming an angle which is strictly between 0 and 90°.

9 Claims, 4 Drawing Sheets

(56) References Cited

U.S. PATENT DOCUMENTS

| | | | | |
|---|---|---|---|---|
| 4,863,345 | A * | 9/1989 | Thompson | F01D 11/18 415/174.1 |
| 5,756,217 | A * | 5/1998 | Schroder | F01D 5/20 428/148 |
| 6,164,655 | A * | 12/2000 | Bothien | F16J 15/447 277/303 |
| 6,203,273 | B1 * | 3/2001 | Weiner | F01D 11/025 415/131 |
| 8,257,022 | B2 * | 9/2012 | Guemmer | F04D 29/685 415/144 |
| 8,757,966 | B2 | 6/2014 | Blanchard et al. | |
| 9,650,906 | B2 * | 5/2017 | Gore | F16J 15/4472 |
| 2006/0213435 | A1 * | 9/2006 | Friedrich | C23C 30/00 118/302 |
| 2008/0089783 | A1 * | 4/2008 | Addis | F01D 5/20 415/170.1 |
| 2008/0260523 | A1 * | 10/2008 | Alvanos | F01D 11/001 415/173.4 |
| 2009/0238683 | A1 * | 9/2009 | Alvanos | F01D 11/122 415/173.7 |
| 2011/0268561 | A1 * | 11/2011 | Blanchard | F01D 5/282 415/174.4 |
| 2013/0280047 | A1 * | 10/2013 | Willett, Jr. | F01D 5/20 415/170.1 |
| 2014/0294570 | A1 * | 10/2014 | Hiller | F01D 11/08 415/173.1 |
| 2015/0176424 | A1 * | 6/2015 | Simon-Delgado | F01D 11/001 60/799 |
| 2015/0192029 | A1 * | 7/2015 | Roberts, III | F01D 5/20 415/173.1 |
| 2016/0305285 | A1 | 10/2016 | Urac et al. | |
| 2017/0058689 | A1 * | 3/2017 | Gaebler | F01D 11/127 |
| 2017/0130601 | A1 * | 5/2017 | Coutandin | F01D 11/02 |
| 2017/0226866 | A1 * | 8/2017 | Nishimura | F01D 5/20 |
| 2018/0023396 | A1 * | 1/2018 | Narrow | F01D 5/025 60/805 |
| 2018/0156070 | A1 * | 6/2018 | Desforges | F01D 25/246 |
| 2018/0355732 | A1 * | 12/2018 | Hall | F01D 5/20 |
| 2019/0186282 | A1 * | 6/2019 | Scholtes | F01D 11/02 |
| 2020/0011193 | A1 * | 1/2020 | Albers | F01D 11/122 |

\* cited by examiner

SEALING RING ELEMENT FOR A TURBINE COMPRISING AN INCLINED CAVITY IN AN ABRADABLE MATERIAL

TECHNICAL FIELD

This invention relates to the field of turbomachines, in particular gas turbine engines, and more particularly to the general field of sealing elements, in particular stator sealing elements, used in seals, in particular labyrinth seals, between parts in rotation with respect to one another of a turbine, in particular between the mobile and stator parts of a turbine.

The invention applies to any type of land or aeronautical turbomachines, and in particular to aircraft turbomachines such as turbojets and turboprops. More preferably, the invention can be applied to a turbofan jet engine.

PRIOR ART

A gas turbine engine comprises, on the turbine for example, seals between the outer radial ends of the rotating blades and the surface of the stator swept by the outer radial ends of the rotating stage. This entails preventing a portion of the engine gas from working by by-passing the stage of the turbine. Labyrinth seals are used for this purpose. These seals comprise a sealing element integral with the rotor, formed of one or several blades, designated as "wipers" arranged radially and transversally in relation to the X axis (see FIG. 1) of rotation of the machine. They also include a complementary stator element, opposite the blades. This element has a surface portion that engages with the blades in order to arrange the lowest play possible. Several blades in parallel induce a succession of load losses in gas flow which by-passes the stage of the turbine, providing the desired seal.

Such labyrinth seals are arranged at several locations of the engine, for example between the shaft of the turbine and the base of the stator stage, formed of stator fins, between two successive rotating stages of a turbine.

By way of example, FIG. 1 diagrammatically shows as a partial axial cross-section an example of a low pressure turbine 1 of the type known as a gas turbine engine, representing the technical context of the invention.

This turbine 1 here has four stages. The rotor 2 of the turbine 1 is formed in this example of four turbine discs 4 bolted together. Each turbine disc 4 carried respectively on its rim the rotating blades 4a. At the external radial end, the rotating blades 4a are provided with a stub 4t whereon are arranged radial blades 4l respectively, turned towards the stator 3. In the example of FIG. 1, each stub 4t supports two radial blades 4l forming the wipers of labyrinth seals. Opposite the wipers, the stator comprises sealing elements 5 which, as is known per se, form with the wipers on the stubs 4t labyrinth seals. The labyrinth seals are in this example with different radii in relation to the X axis de la machine.

There are also labyrinth seals on the inner radial end of the wheels of inter-stage stator blades 6. The stator sealing element 6s is a ring in two halves, for example. The wipers 2l are supported by the lateral extensions of the turbine discs 4 that connect the latter via bolting.

The gas turbine engines according to their operating conditions undergo variations in differential dilatation between in particular the stator elements and those of the rotor. These differences in variation, if they are not controlled, can affect the play between the rotating and fixed portions. It is as such that for a propulsion engine of an aircraft undergoing in flight a flame going out in the combustion chamber for any reason whatsoever, all of the turbine, as it is no longer being passed through by gases at a high temperature, is cooled. However, the casing can cool down faster than the turbine rotor, with an impact on the play. However, in order to have optimum output, the play of the labyrinth seals is calculated to be, during operation, as low as possible. This results in a risk of rotor lock due to the more or less tight contact of the wipers with the abradable material of the stator element, in such a situation. Note that the abradable material is a material which is worn or deformed in contact with the wiper in rotation, preferably to the latter. It can very particularly be a honeycomb material.

The characteristics of the labyrinth seal are determined and adjusted to allow for a variation in the play and a possible weak contact during the various phases of flight, in normal operation, when the dimensional variations are substantial resulting from an incident of this type, the labyrinth seal can no longer fulfil its role. As the rotor is prevented from rotating, restarting the engine via windmilling of the low pressure (LP) or high pressure (HP) body, or by driving by an auxiliary engine, may not occur satisfactorily.

In order to prevent tightening of the rotor in case of such an extinction of the combustion chamber, it could be considered to increase the play between the wipers and the abradable material. However, this solution is not economically viable due to the drop in performance of the engine that it would induce.

Solutions have therefore already been considered in order to make it possible to handle the situation of an untimely extinction of the combustion chamber without reducing the performance of the engine in normal operation.

As such, in reference to FIG. 2, an embodiment of a stator sealing element 6s of a labyrinth seal implementing an example of such solutions is shown.

In this example, the seal is carried out on the inner radial end of the inter-stage stator disc. The stator sealing element 6s is a ring sector. It comprises two surface portions 6p arranged in order to each engage with a wiper 2l of the stub 4t of the blade of the stage considered. In addition, each surface portion 6p comprises a first area 6p1 and a second area 6p2. The first area 6p1 is upstream of the second area 6p2 and engages with a wiper 2l of the stub 4t. This first area 6p1 corresponds to the axial position of the wiper 2l in normal operation of the machine. The play between the wiper 2l and the abradable material of the sealing element 6s is controlled. In normal operation of the gas turbine engine, outside of a windmilling phase, the labyrinth seal does not undergo any substantial deterioration, the differences in temperature are controlled, and the differences in dilatation between the rotating portions and the stator portions do not affect the surface of the abradable material. The wipers 2l then come on the first area 6p1 of the abradable material.

In the second area 6p2, located downstream from the first area 6p1, the thickness of the layer of the abradable material is reduced. An annular cavity 6c, or notch, is indeed machined in the material in order to weaken it. This annular cavity 6c is located at the internal periphery of the sealing element 6s and opens radially inwards. This second area 6p2 corresponds to the axial position of the wiper 2l during an extreme operation of the engine, such as the positioning of the wipers 2l shown in FIG. 2, where the combustion chamber has gone out in flight. The rotor is then able to be clamped by the stator element. Indeed, when the combustion chamber has gone out for an undesired reason, engine gases no longer pass through the rotors and they are subjected to the pressure of the air coming into the engine. In this situation, the rotors are subjected to an axial displacement in the downstream direction. From the differential cooling between the rotor and the stator, it follows that, if the stator is cooled quickly and retracts, the ends of the wipers penetrate into the abradable material of which the penetration resistance is therefore reduced due to the cavities 6c. The, the risk of rotor lock can be decreased.

However, this solution does not necessarily make it possible to prevent the risk of rotor lock. Indeed, during a reignition, following a windmilling phase, the wipers 2l will be displaced, from their axial position on the first area 6p1, in the downstream direction to arrive on the second area 6p2 and cavities 6c. However, during this conveyance C, symbolized by the arrows C in FIG. 2, borrowed by the wipers 2l, the latter pass through a portion of the abradable material 6c located in the first area 6p1. By passing through this portion of abradable material, a phenomenon of rotor lock can appear.

It could then be possible to consider directly bevelling this portion of abradable material through which pass the wipers 2l during their conveyance C from the first area 6p1 to the second area 6p2. However, such a solution would have a negative impact on the performance of the engine during its normal operation in such a way that it does not appear to be able to be considered.

DISCLOSURE OF THE INVENTION

The invention therefore has for purpose to remedy at least partially the needs mentioned hereinabove and the disadvantages concerning the embodiments of prior art.

In particular, the invention aims to propose an alternative solution to those of prior art in order to decrease, and even eliminate, the risk of rotor lock following an untimely extinction of the combustion chamber without however reducing the performance of the engine during normal operation.

The invention as such has for object, according to one of its aspects, a sealing ring element, in particular a stator sealing ring, of a turbomachine, in particular of a turbomachine turbine, arranged about an axis of a turbomachine, the sealing ring element being made from an abradable material and comprising at least one sealing portion able to engage with at least one sealing wiper, said at least one sealing portion comprising a first area, having in particular a first wiper penetration resistance, and a second area adjacent to the first area in the direction of the axis of the turbomachine, in other words axially, having in particular a wiper penetration resistance that is reduced with respect to the first area, with the inner surface of a first area being at the same radial distance from the axis de turbomachine for any sealing portion,
characterised in that said at least one sealing portion comprises an annular cavity, advantageously formed in the abradable material, which opens into an inner surface of the second area and extends into the first area, with the annular cavity defining an upstream lateral wall and/or a downstream lateral wall forming an angle with the inner surface of the first area, in particular with the axis along which extends the inner surface of the first corresponding area, strictly between 0 and 90°, in such a way that a portion of the abradable material of the first area is radially superimposed on a portion of the annular cavity.

Advantageously, the sealing ring element is arranged to form a labyrinth seal in association with at least one annular wiper about the axis of the labyrinth seal.

Advantageously, the annular cavity defines an upstream lateral wall and a downstream lateral wall which are substantially radial and which are at least partially mutually facing one another.

More preferably, the upstream lateral wall and/or the downstream lateral wall extend respectively, through observation as an axial section, along an upstream axis of the cavity and/or along a downstream axis of the cavity that are not perpendicular to the axis of the turbomachine.

The sealing ring element according to the invention can furthermore comprise one or several of the following characteristics taken individually or in any technically permissible combinations.

The sealing ring element can be a sealing ring sector or a complete ring.

Advantageously, the radius of a first area of a sealing portion is constant pour all of the first areas of several sealing surface portions. Again in other words, the abradable material is not of the staged type, i.e. with an inner surface that has, in the axial section, a staircase shape with an alternation of marches and risers.

Further advantageously, the upstream lateral wall and/or the downstream lateral wall of said at least one annular cavity annularly defining a surface portion with tapered shape.

The abradable material can comprise an upstream lateral wall and a downstream lateral wall extending respectively, through observation as an axial section, along an upstream axis of the abradable material and a downstream axis of the abradable material parallel to the upstream axis of the cavity and/or the downstream axis of the cavity.

The abradable material can very particularly be a material of the honeycomb type, with the cells of the honeycomb being oriented along the upstream axis of the cavity and/or the downstream axis of the cavity.

Said annular cavity can be formed, in particular by machining, over the entire circumference of the abradable material about the axis of the turbomachine.

In addition, said annular cavity can be formed, in particular by machining, at the internal periphery of the abradable material and opens radially inwards.

Furthermore, said annular cavity can comprise a bottom wall extending, through observation as an axial section, parallel to the axis of the turbomachine.

The sealing ring element can preferably be a stator sealing ring element.

As such, the stator sealing ring element can for example be arranged to form a seal at the radial end of the rotating blades of a turbine. The stator sealing ring element can also be arranged to form a seal at the inner radial end of the stator blades of a turbine.

Moreover, the invention also has for object, according to another of its aspects, a seal, in particular a labyrinth seal, for a turbomachine, in particular a turbomachine turbine, used to provide the seal between two elements of the turbomachine in rotation with respect to one another and being of revolution about the axis of the seal, comprising:
  at least one sealing ring element such as defined hereinabove, annular about the axis of the seal, intended to be supported by one of the two elements of the turbomachine in rotation with respect to one another,
  at least one wiper, annular about the axis of the seal, intended to be supported by the other of the two elements of the turbomachine in rotation with respect to one another.

Said at least one wiper can comprise a downstream lateral wall, intended to come opposite a downstream lateral wall of said cavity. Through observation as an axial section, the angle formed between the downstream axis of the cavity and the axis along which extends the inner surface of the first area associated with said cavity can be greater than or equal to the angle formed between the axis along which extends the downstream lateral wall of said at least one wiper and the axis along which extends the inner surface of the first area associated with said cavity, in such a way that said at least one wiper can penetrate into said annular cavity.

Furthermore, the invention also has for object, according to another of its aspects, a turbine of a gas turbine engine, characterised in that it comprises a sealing ring element such as defined hereinabove or a seal such as defined hereinabove, said first area of said at least one sealing portion corresponding to the nominal operation of the turbine and said second area of said at least one sealing portion corresponding to the operation in the reignition phase after an extinction of the combustion chamber.

In addition, the invention further has for object, according to another of its aspects, a turbomachine, in particular a gas turbine engine, characterised in that it comprises a turbine, a seal or a sealing ring element such as defined hereinabove.

The invention has in particular an application wherein the element is arranged to form a labyrinth seal at the inner radial end of the stator blades of a turbine.

BRIEF DESCRIPTION OF THE DRAWINGS

The invention can be understood better when reading the following detailed description of non-limiting embodiments of the latter, as well as the examination of the figures, diagrammatical and partial, of the annexed drawing, wherein.

In all of these figures, identical references can designate identical or similar elements.

In addition, the various portions shown in the figures are not necessarily shown according to a uniform scale, in order make the figures more legible.

DETAILED DESCRIPTION OF PARTICULAR EMBODIMENTS

Figure 1:
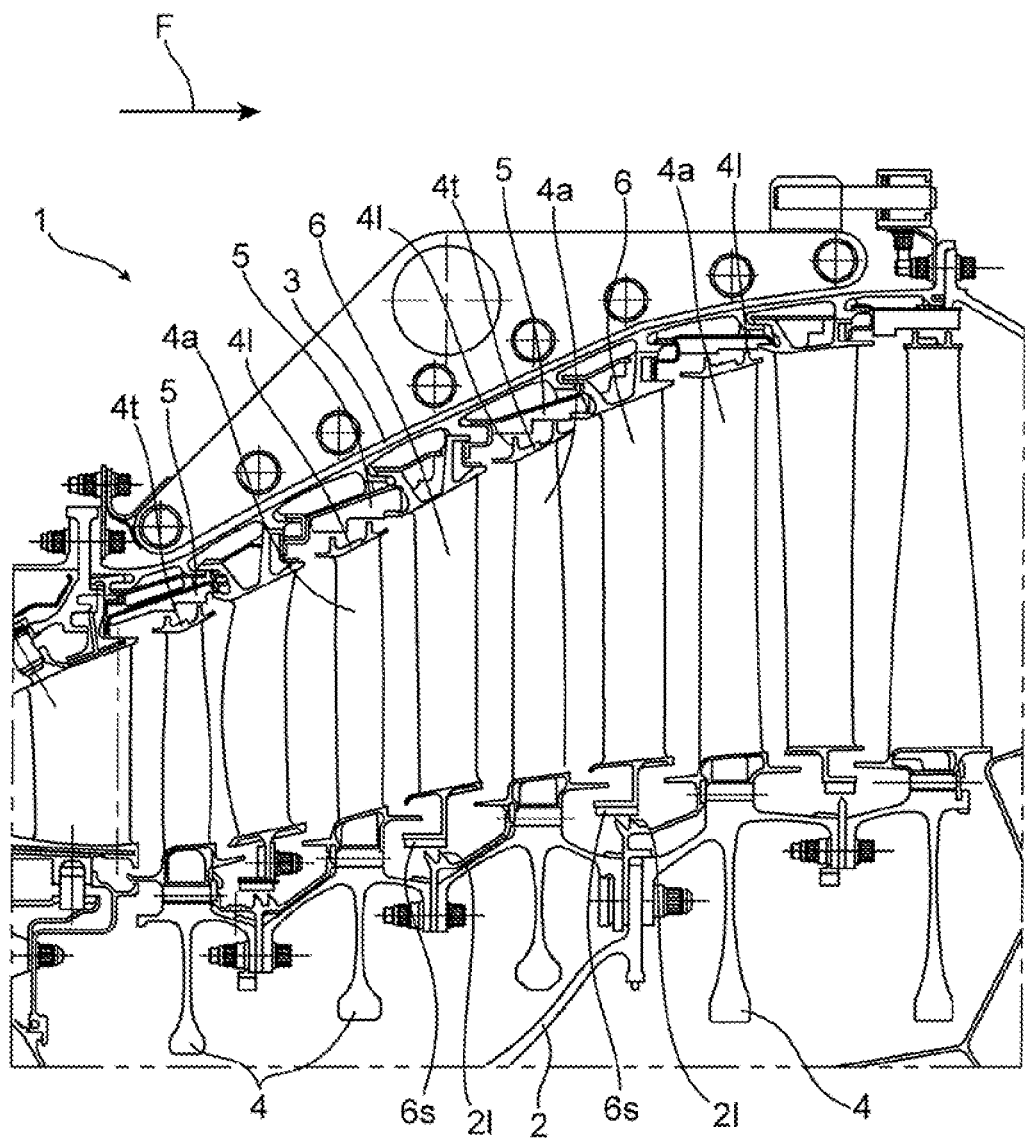
FIG. 1 shows, as a partial axial cross-section, an example of a low-pressure turbine of a gas turbine engine representative of the technical context of the invention.

In all of the description, it is noted that the terms upstream and downstream are to be considered in relation to a main direction F, shown in FIG. 1, of the normal flow of gas (in a downstream direction) for a turbomachine. Moreover, the axis X of the seal or of the turbomachine refers to the radial axis of, the axis of radial symmetry of the seal or of the turbomachine. The axial direction of the seal corresponds to the direction of the X axis of the seal. A radial direction of the seal is a direction perpendicular to the X axis of the seal.

Furthermore, unless mentioned otherwise, the adjectives and adverbs axial, radial, axially and radially are used in reference to the aforementioned axial and radial directions. In addition, unless mentioned otherwise, the terms inner and outer are used in reference to a radial direction in such a way that the inner portion of an element is closer to the X axis of the seal than the outer portion of the same element.

Figure 2:
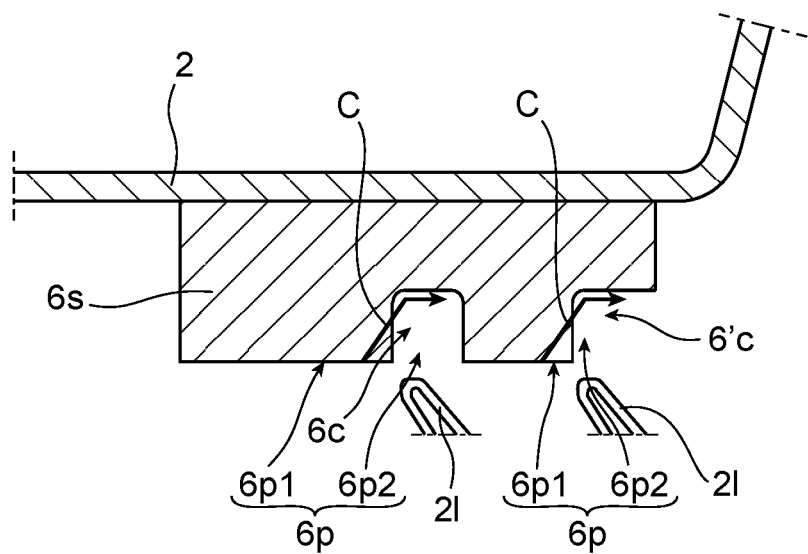
FIG. 2 shows, very diagrammatically as a partial cross-section, a known embodiment of a stator sealing element of a labyrinth seal.

FIGS. 1 and 2 were described hereinabove in the portion relative to prior art and in the technical context of the invention.

In reference to FIGS. 3 to 6, embodiments of a sealing ring element 6s of a labyrinth seal in accordance with the invention shall now be described. In these examples, the sealing ring element 6s is of the stator type. It forms a labyrinth seal in association with two annular wipers 2l about the axis X of the labyrinth seal. However, these choices are in no way limiting.

As can be seen in these FIGS. 3 to 6, the sealing ring element 6s comprises an abradable material with two sealing surface portions 6p, with each one able to engage with a corresponding wiper 2l.

Each sealing portion 6p axially comprises a first area 6p1 with a first wiper penetration resistance 2l and a second area 6p2, adjacent to the first area 6p1 and located downstream from the latter, with a wiper penetration resistance 2l that is reduced with respect to the first area 6p1.

In other words, the second area 6p2 makes through it configuration the first area 6p1 more resistant to wiper penetration in the radial direction.

In addition, as can be seen in these FIGS. 3 to 6, the inner surface 6i of the first areas 6p1 is at the same radial distance from the axis X of the labyrinth seal for the two sealing surface portions 6p. In other words, the abradable material is advantageously not of the "staged" type.

Moreover, in accordance with the invention, each second area 6p2 comprises an annular cavity 6c, formed in the abradable material, in particular by machining.

The first upstream cavity 6c comprises an upstream lateral wall 6m and a downstream lateral wall 6v extending respectively, through observation as an axial section, along an upstream axis of the cavity Cm and along a downstream axis of the cavity Cv. These lateral upstream 6m and downstream 6v walls are connected by a bottom wall 6f of this first upstream cavity 6c.

The second downstream cavity 6'c comprises only an upstream lateral wall 6m extending along an upstream axis of the cavity Cm, connected to a bottom wall 6f.

In other words, the first upstream cavity 6c opens onto the inner periphery of the abradable material, and the second downstream cavity 6'c also opens onto the inner periphery of the abradable material and also onto its downstream lateral wall 7v.

Advantageously, the upstream cavity axis Cm and downstream cavity axis Cv are not perpendicular to the X axis of the labyrinth seal. In particular, they are here parallel to each other and form an angle α with the axis Ci along which extends the inner surface 6i of the first areas 6p1 which is strictly between 0 and 90°, being for example between 30 and 60°. In this way, a portion P1 of the abradable material of the first areas 6p1 is superimposed radially on a portion P2 of the cavities 6c, 6'c of the second areas 6p2.

In addition, the axes according to which extend the bottom walls 6f of the cavities 6c, 6'c are advantageously parallel to the X axis of the labyrinth seal.

As such, in order to solve the problem of rotor lock while still preserving the performance of the engine during operation, the invention implements a solution of a cavity or notch that is inclined or encore bevelled.

Figure 3:
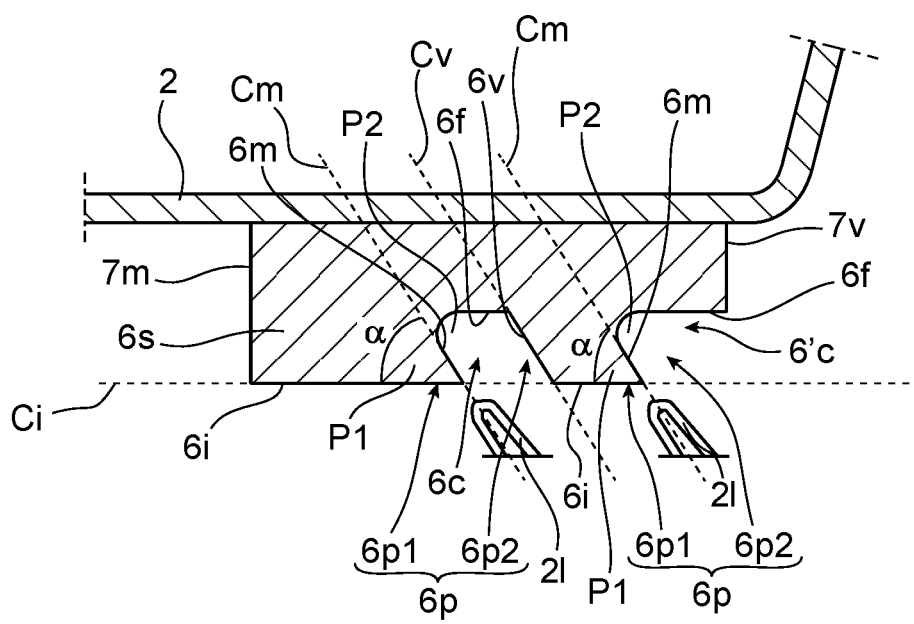
FIGS. 3 and 4 show, very diagrammatically as a partial cross-section, two embodiments of stator sealing elements of a labyrinth seal in accordance with the invention.

In the example of FIG. 3, the lateral upstream 7m and downstream 7v walls of the abradable material are perpendicular to the X axis of the labyrinth seal.

However, as the abradable material is advantageously of the honeycomb type, carrying out cells of the honeycomb in an inclined manner is preferable in order to obtain an optimum resistance of the abradable material. Then, it is also preferable to carry out lateral walls 7m and 7v of the abradable material in an inclined manner.

Figure 4:
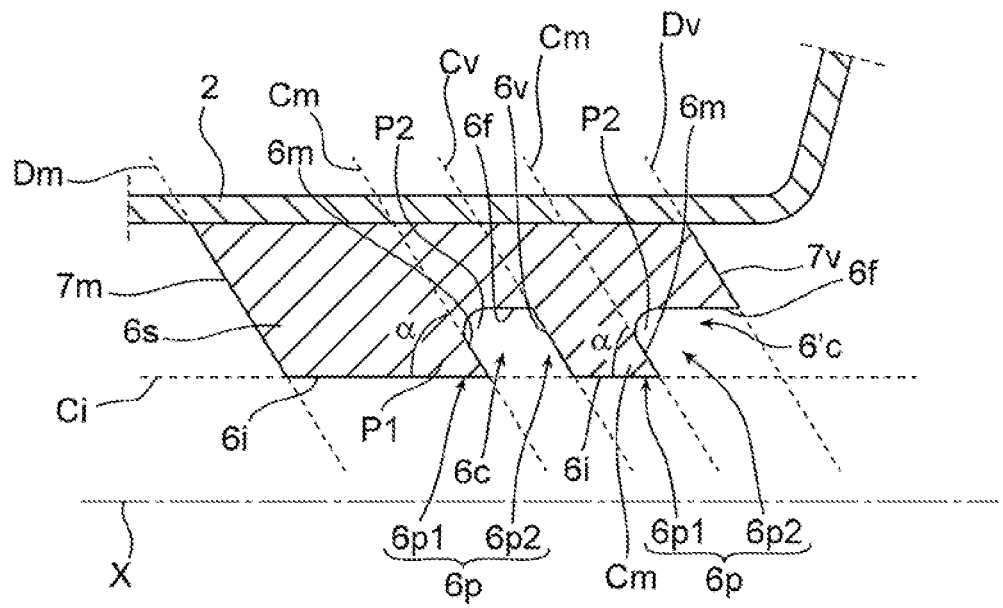

As such, FIG. 4 shows the configuration of the sealing ring element 6s wherein the lateral upstream 7m and downstream 7v walls of the abradable material have the same inclination, in relation to the X axis of the labyrinth seal, as that of the cavities 6c and as that of the cells of the honeycomb. The choice of having meshes according to this slope for the honeycomb makes it possible to facilitate the machining of the cavities 6c. In addition, choosing a slope of inclined meshes that is similar to that of the cavities 6c makes it possible to not lose in performance, for example via air leaks through the cells, contrary to solutions that would consider only the carrying out of holes in the abradable material. There is no loss of performance if the angle of inclination of the honeycomb is at most equal to the angle α. If the angle of inclination of the honeycomb is lower than the angle α, there is no impact on performance.

Figure 5:
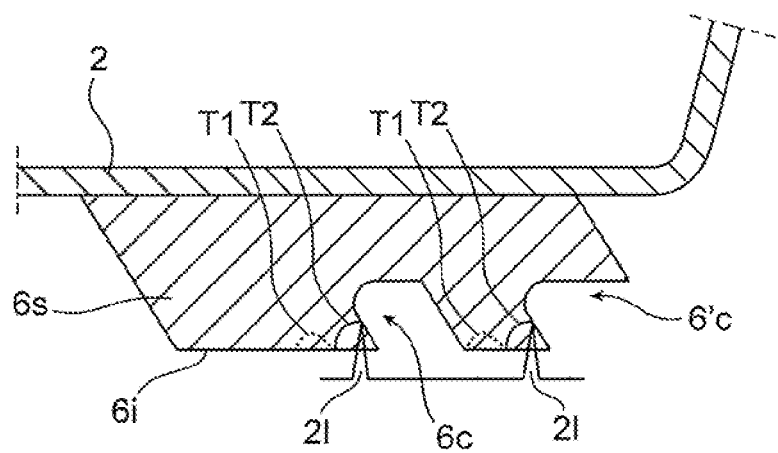
FIG. 5 is a view similar to that of FIG. 4 and makes it possible to show the operating principle of a sealing element according to the invention.

FIG. 5 makes it possible to show the operating principle of the invention. Indeed, thanks to the invention, it is possible, during normal operation, to retain the performance of the engine because the wipers 2l will be opposite the non-machined abradable material, in other words a portion of the abradable material devoid of the presence of an annular cavity 6c, and therefore with an optimum resistance to the passage of air, which corresponds to the plot T1 as a dotted line in FIG. 5.

On the other hand, during a reignition, the wiper 2l will pass through only the tip of the abradable material, as shown by the plot T2 as a solid line in FIG. 5, and break it without causing any rotor lock phenomenon. During the return to normal operation, the loss of performance will then be only the opening due to the loss of the abradable material peak broken.

It is moreover to be noted that the invention makes it possible to easily create two cavities or more on the abradable material, in particular by machining, with the same diameter, without having to make use of a solution of the staged abradable type.

In addition, the carrying out of the cavities 6c is done over 360° in the abradable material.

Figure 6:
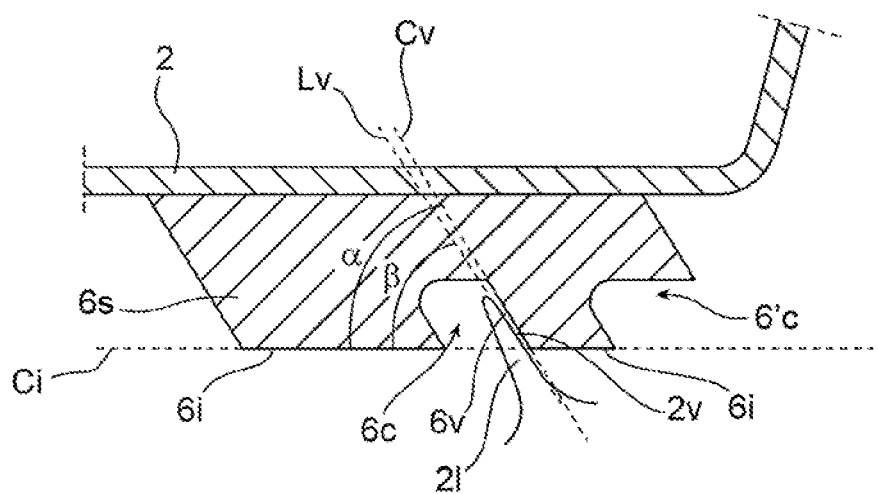
FIG. 6 is a view similar to that of FIG. 4 and makes it possible to show the configuration of the cavity of a sealing element according to the invention opposite that of a corresponding wiper.

Advantageously, the slope of the machining of an annular cavity 6c must be sufficient to allow for the rupture of the abradable material during a reignition and to allow the wiper 2l to go into the annular cavity 6c without blocking it. As such, the number of cavities 6c advantageously corresponds to the number of wipers 2l opposite. Further more precisely, the slope downstream from the annular cavity 6c must be at least equal to the slope of the wiper 2l in order to allow the latter to go to the cavity bottom as shown in FIG. 6. In other words, through observation as an axial section, the angle α formed between the downstream axis of the cavity Cv and the axis Ci along which extends the inner surface 6i of the first area 6p1 associated with the annular cavity 6c is greater than or equal to the angle β formed between the axis Lv along which extends the downstream lateral wall 2v of the wiper 2l and the axis Ci, in such a way that the wiper 2l can penetrate into the annular cavity 6c.

Moreover, the depth of the annular cavities 6c, in other words the distance between the axis Ci and the bottom walls 6f such as shown for example in the FIGS. 3 and 4, can in particular be determined by the predicted wear during a restarting in windmilling phase.

Consequently, the solution proposed by the invention makes it possible to have an operability found in reignition mode while still avoiding the risk of rotor lock, and also makes it possible to not degrade the performance in nominal operation.

Of course, the invention is not limited to the embodiments that have just been described. Various modifications can be made thereto by those skilled in the art.

The invention claimed is:

1. A seal for a turbomachine, used to provide the seal between first and second elements of the turbomachine in rotation with respect to one another and being of revolution about an axis of the seal comprising:
   a wiper, annular about the axis of the seal, intended to be supported by the second element of the turbomachine; and
   a sealing ring element of the turbomachine arranged about a turbomachine axis, the sealing ring element being annular about the axis of the seal and intended to be supported by the first element of the turbomachine, the sealing ring element being made from an abradable material and comprising
   a sealing portion able to engage with the wiper, said sealing portion comprising
   a first area and a second area adjacent to the first area in a direction of the turbomachine axis, with an inner surface of the first area being at a same radial distance from the turbomachine axis for any sealing surface portion of the first area, and an annular cavity formed in the abradable material by machining the second area and which opens into an inner surface of the second area and extends into the first area, the inner surface of the second area being defined by a bottom wall of the annular cavity and disposed radially outward of the inner surface of the first area, the bottom wall of the annular cavity being parallel to the axis of the seal, and the annular cavity defining at least one of an upstream lateral wall or a downstream lateral wall connected to the bottom wall and forming an angle with the inner surface of the first area strictly between 0 and 90°, in such a way that a portion of the abradable material of the first area is radially superimposed on a portion of the annular cavity such that the portion of the abradable material and the portion of the annular cavity overlap each other, and an end point of the first area overlaps the inner surface of the second area,
   wherein said wiper comprises a downstream lateral wall, intended to come opposite the downstream lateral wall of said annular cavity, and, through observation as an axial section, an angle formed between a plane of the downstream lateral wall of the annular cavity and a plane along which extends the inner surface of the first area associated with said annular cavity being greater than or equal to an angle formed between a plane along which extends the downstream lateral wall of said wiper and the plane along which extends the inner surface of the first area associated with said annular cavity, in such a way that said wiper can penetrate into said annular cavity without blocking the annular cavity during reignition of the turbomachine.

2. The seal according to claim 1, wherein at least one of the upstream lateral wall or the downstream lateral wall extends respectively, through observation as the axial section, along an upstream axis of the annular cavity and along a downstream axis of the annular cavity that are not perpendicular to the turbomachine axis of the turbomachine, and wherein the abradable material comprises an upstream lateral wall and a downstream lateral wall extending respectively, through observation as an axial section, along an upstream axis of the abradable material and a downstream axis of the abradable material parallel to the upstream axis of the annular cavity and/or the downstream axis of the annular cavity.

3. The seal according to claim 2, wherein the abradable material is a honeycomb material, with cells of the honeycomb being oriented along at least one of the upstream axis of the annular cavity or the downstream axis of the annular cavity.

4. The seal according to claim 1, wherein said annular cavity is formed over an entire circumference of the abradable material about the turbomachine axis.

5. The seal as claimed in claim 1, wherein said annular cavity is formed at an internal periphery of the abradable material and opens radially inwards.

6. A turbine of a gas turbine engine, comprising a seal according to claim 1, said first area of said sealing portion corresponding to a nominal operation zone of the turbine and said second area of said sealing portion corresponding to an operation zone in a reignition phase after an extinction of a combustion chamber.

7. A turbomachine comprising a turbine according to claim 6.

8. The seal according to claim 1, wherein the second area of the sealing portion is disposed downstream of the first area of the sealing portion.

9. The seal according to claim 1, wherein the wiper is only opposite of the first area during normal operation of the turbomachine.

* * * * *